US012563626B2

(12) United States Patent
Godin et al.

(10) Patent No.: US 12,563,626 B2
(45) Date of Patent: Feb. 24, 2026

(54) SLICE AWARE PRE-EMPTION SIGNALING AND PROCESS

(71) Applicant: Nokia Technologies Oy, Espoo (FI)

(72) Inventors: Philippe Godin, Versailles (FR); Anna Sillanpaa, Jarvenpaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 492 days.

(21) Appl. No.: 18/006,842

(22) PCT Filed: Jun. 22, 2021

(86) PCT No.: PCT/IB2021/055507
§ 371 (c)(1),
(2) Date: Jan. 25, 2023

(87) PCT Pub. No.: WO2022/029518
PCT Pub. Date: Feb. 10, 2022

(65) Prior Publication Data
US 2023/0269813 A1 Aug. 24, 2023

Related U.S. Application Data

(60) Provisional application No. 63/061,490, filed on Aug. 5, 2020.

(51) Int. Cl.
*H04W 76/20* (2018.01)
*H04W 76/10* (2018.01)

(52) U.S. Cl.
CPC ........... *H04W 76/20* (2018.02); *H04W 76/10* (2018.02)

(58) Field of Classification Search
CPC ..... H04W 76/20; H04W 76/10; H04W 40/36; H04W 28/10; H04L 47/78
See application file for complete search history.

(56) References Cited

U.S. PATENT DOCUMENTS

| 10,667,179 B1 * | 5/2020 | Young ................... H04W 36/06 |
| 2021/0352521 A1 * | 11/2021 | Pan ........................ H04L 47/805 |

FOREIGN PATENT DOCUMENTS

| CN | 110769468 A | 2/2020 |
| WO | 2019/105095 A1 | 6/2019 |

OTHER PUBLICATIONS

"3rd Generation Partnership Project; Technical Specification Group Radio Access Network; NG-RAN; Xn application protocol (XnAP) (Release 16)", 3GPP TS 38.423, V16.2.0, Jul. 2020, pp. 1-447.

(Continued)

*Primary Examiner* — Jamal Javaid

(74) *Attorney, Agent, or Firm* — Carter, DeLuca & Farrell LLP

(57) ABSTRACT

Method, apparatus and computer program product for slice aware pre-emption signaling. A method include receiving (500) at a network node, a first session setup or modification request message for a first user equipment setting up a first session flow. The method also includes receiving (505) at the network node, a second session setup or modification request message for a second user equipment setting up a second session flow. The method further includes receiving (510) at the network node, a third session setup or modification request message for a third user equipment setting up a third session flow. In addition, the method includes pre-empting (515) the first session flow or the second session flow based on a pre-emptable information element or a non-pre-emptable information element.

16 Claims, 8 Drawing Sheets

(56) References Cited

OTHER PUBLICATIONS

"3rd Generation Partnership Project; Technical Specification Group Radio Access Network; NG-RAN; E1 Application Protocol (E1AP) (Release 16)", 3GPP TS 38.463, V16.2.0, Jul. 2020, pp. 1-230.

"3rd Generation Partnership Project; Technical Specification Group Radio Access Network; NG-RAN; F1 application protocol (F1AP) (Release 16)", 3GPP TS 38.473, V16.2.0, Jul. 2020, pp. 1-363.

International Search Report and Written Opinion received for corresponding Patent Cooperation Treaty Application No. PCT/IB2021/055507, dated Sep. 20, 2021, 18 pages.

"Correction of ARP", 3GPP TSG-RAN WG3#111-e, R3-210420, Nokia, Jan. 25-Feb. 4, 2021, 7 pages.

"Summary of Offline Discussion on ARP Correction", 3GPP TSG-RAN WG3 #111, R3-211126, Nokia, Jan. 25-Feb. 4, 2021, 4 pages.

"3rd Generation Partnership Project; Technical Specification Group Radio Access Network; NR; NR and NG-RAN Overall Description; Stage 2 (Release 15)", 3GPP TS 38.300, V15.10.0, Jul. 2020, pp. 1-100.

"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.

"3rd Generation Partnership Project; Technical Specification Group Radio Access Network; NG-RAN; NG Application Protocol (NGAP) (Release 16)", 3GPP TS 38.413, V16.2.0, Jul. 2020, pp. 1-462.

"Considering slice related information during Xn-based handover", 3GPP TSG-RAN WG3 Meeting #NR AdHoc, R3-172565, Agenda Item: 10.2, LG Electronics Inc, Jun. 27-29, 2017, 8 pages.

"Correction of ARP", 3G PP TSG-RAN WG3#111-e, R3-210419, Agenda Item: 9.3.8.1, Nokia, Jan. 25-Feb. 4, 2021, 3 pages.

* cited by examiner

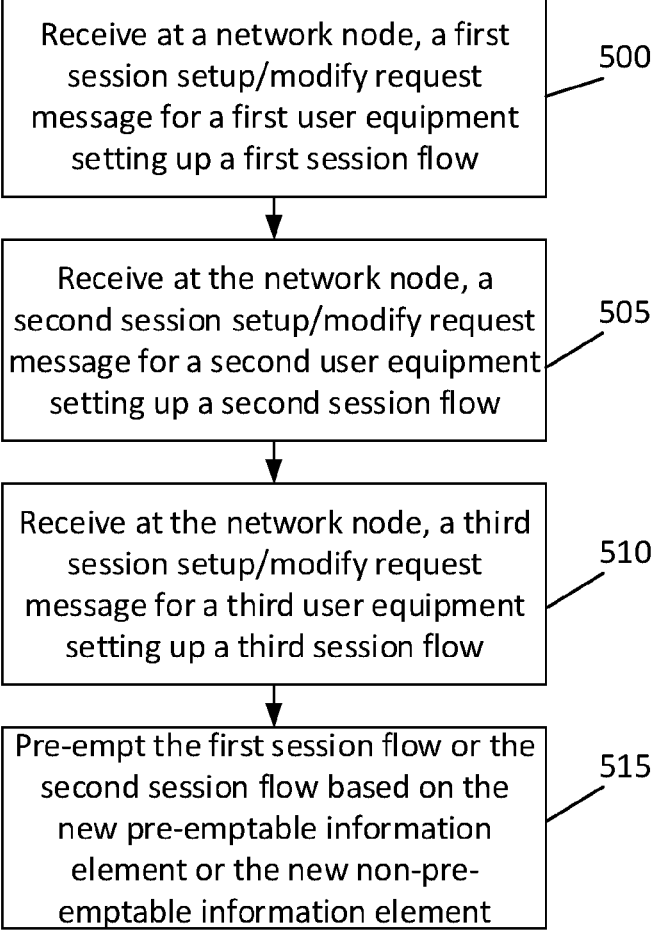

Receive at a network node, a first session setup/modify request message for a first user equipment setting up a first session flow    500

Receive at the network node, a second session setup/modify request message for a second user equipment setting up a second session flow    505

Receive at the network node, a third session setup/modify request message for a third user equipment setting up a third session flow    510

Pre-empt the first session flow or the second session flow based on the new pre-emptable information element or the new non-pre-emptable information element    515

FIG. 5

SLICE AWARE PRE-EMPTION SIGNALING AND PROCESS

RELATED APPLICATION

This application claims priority to PCT Application No. PCT/IB2021/055507 filed Jun. 22, 2021, which claims priority benefit from U.S. application 63/061,490 filed Aug. 5, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for slice aware pre-emption signaling.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Various aspects of examples of the invention are set out in the claims.

According to a first aspect of the present invention, a method comprising: receiving at a network node, a first session setup or modification request message for a first user equipment setting up a first session flow; receiving at the network node, a second session setup or modification request message for a second user equipment setting up a second session flow; receiving at the network node, a third session setup or modification request message for a third user equipment setting up a third session flow, wherein the third session flow comprises a third parameter, and wherein the third parameter comprises a pre-emptable information element or a non-pre-emptable information element that comprises a first slice to which the first session flow belongs or a second slice to which the second session flow belongs;

and pre-empting the first session flow or the second session flow based on the pre-emptable information element or the non-pre-emptable information element.

According to a second aspect of the present invention, an apparatus comprising: at least one processor; and at least one memory including computer program code, wherein the at least one memory and the computer program code are configured, with the at least one processor, to cause the apparatus to at least: receiving a first session setup or modification request message for a first user equipment setting up a first session flow; receive a second session setup or modification request message for a second user equipment setting up a second session flow; receive a third session setup or modification request message for a third user equipment setting up a third session flow, wherein the third session flow comprises a third parameter, and wherein the third parameter comprises a pre-emptable information element or a non-pre-emptable information element that comprises a first slice to which the first session flow belongs or a second slice to which the second session flow belongs; and pre-empt the first session flow or the second session flow based on the pre-emptable information element or the non-pre-emptable information element.

According to a third aspect of the present invention, a non-transitory computer storage medium encoded with a computer program, the program comprising instructions that when executed by one or more computers cause the one or more computers to perform operations comprising: receiving at a network node, a first session setup or modification request message for a first user equipment setting up a first session flow; receiving at the network node, a second session setup or modification request message for a second user equipment setting up a second session flow; receiving at the network node, a third session setup or modification request message for a third user equipment setting up a third session flow, wherein the third session flow comprises a third parameter, and wherein the third parameter comprises a pre-emptable information element or a non-pre-emptable information element that comprises a first slice to which the first session flow belongs or a second slice to which the second session flow belongs; and pre-empting the first session flow or the second session flow based on the pre-emptable information element or the non-pre-emptable information element.

According to a fourth aspect of the present invention, a method comprising: sending to a network node, a first session setup or modification request message for a first user equipment setting up a first session flow; sending to the network node, a second session setup or modification request message for a second user equipment setting up a second session flow; and sending to the network node, a third session setup or modification request message for a third user equipment setting up a third session flow, wherein the third session flow comprises a third parameter, wherein the third parameter comprises a pre-emptable information element or a non-pre-emptable information element that comprises a first slice to which the first session flow belongs or a second slice to which the second session flow belongs, and wherein the pre-emptable information element or new non-pre-emptable information element determines which of the first session flow or the second session flow is pre-empted.

According to a fifth aspect of the present invention, an apparatus comprising: at least one processor; and at least one memory including computer program code, wherein the at least one memory and the computer program code are configured, with the at least one processor, to cause the apparatus to at least: send to a network node, a first session setup or modification request message for a first user equipment setting up a first session flow; send to the network node, a second session setup or modification request message for a second user equipment setting up a second session flow; and send to the network node, a third session setup or modification request message for a third user equipment setting up a third session flow, wherein the third session flow comprises a third parameter, wherein the third parameter comprises a pre-emptable information element or a non-pre-emptable information element that comprises a first slice to which the first session flow belongs or a second slice to which the second session flow belongs, and wherein the pre-emptable information element or new non-pre-emptable information element determines which of the first session flow or the second session flow is pre-empted.

According to a sixth aspect of the present invention, a non-transitory computer storage medium encoded with a computer program, the program comprising instructions that when executed by one or more computers cause the one or more computers to perform operations comprising: sending to a network node, a first session setup or modification request message for a first user equipment setting up a first session flow; sending to the network node, a second session setup or modification request message for a second user equipment setting up a second session flow; and sending to the network node, a third session setup or modification request message for a third user equipment setting up a third session flow, wherein the third session flow comprises a third parameter, wherein the third parameter comprises a pre-emptable information element or a non-pre-emptable information element that comprises a first slice to which the first session flow belongs or a second slice to which the second session flow belongs, and wherein the pre-emptable information element or new non-pre-emptable information element determines which of the first session flow or the second session flow is pre-empted.

According to a seventh aspect of the present invention, an apparatus comprising: means for receiving a first session setup or modification request message for a first user equipment setting up a first session flow; means for receiving a second session setup or modification request message for a second user equipment setting up a second session flow; means for receiving a third session setup or modification request message for a third user equipment setting up a third session flow, wherein the third session flow comprises a third parameter, and wherein the third parameter comprises a pre-emptable information element or a non-pre-emptable information element that comprises a first slice to which the first session flow belongs or a second slice to which the second session flow belongs; and means for pre-empting the first session flow or the second session flow based on the pre-emptable information element or the non-pre-emptable information element.

According to an eighth aspect of the present invention, an apparatus comprising: means for sending to a network node, a first session setup or modification request message for a first user equipment setting up a first session flow; means for sending to the network node, a second session setup or modification request message for a second user equipment setting up a second session flow; and means for sending to the network node, a third session setup or modification request message for a third user equipment setting up a third session flow, wherein the third session flow comprises a third parameter, wherein the third parameter comprises a pre-emptable information element or a non-pre-emptable information element that comprises a first slice to which the first session flow belongs or a second slice to which the second session flow belongs, and wherein the pre-emptable information element or new non-pre-emptable information element determines which of the first session flow or the second session flow is pre-empted.

According to a ninth aspect of the present invention, a method comprising: receiving at a network node, in a setup or configuration message a list of supported slices and for each supported slice an associated pre-emptable information element or a non-pre-emptable information element comprising slices; receiving at the network node, a first session setup or modification request message for a first user equipment setting up a first session flow belonging to a first slice; receiving at the network node, a second session setup or modification request message for a second user equipment setting up a second session flow belonging to a second slice; receiving at the network node, a third session setup or modification request message for a third user equipment setting up a third session flow belonging to a third slice, wherein the first slice and the second slice are comprised in the pre-emptable information element or the non-pre-emptable information element associated with the third slice; and pre-empting the first session flow or the second session flow when admitting the third session flow based on the pre-emptable information element or the non-pre-emptable information element.

According to a tenth aspect of the present invention, an apparatus comprising: at least one processor; and at least one memory including computer program code, wherein the at least one memory and the computer program code are configured, with the at least one processor, to cause the apparatus to at least: receive in a setup or configuration message a list of supported slices and for each supported slice an associated pre-emptable information element or a non-pre-emptable information element comprising slices; receive a first session setup or modification request message for a first user equipment setting up a first session flow belonging to a first slice; receive a second session setup or modification request message for a second user equipment setting up a second session flow belonging to a second slice; receive a third session setup or modification request message for a third user equipment setting up a third session flow belonging to a third slice, wherein the first slice and the second slice are comprised in the pre-emptable information element or the non-pre-emptable information element associated with the third slice; and pre-empt the first session flow or the second session flow when admitting the third session flow based on the pre-emptable information element or the non-pre-emptable information element.

According to an eleventh aspect of the present invention, a non-transitory computer storage medium encoded with a computer program, the program comprising instructions that when executed by one or more computers cause the one or more computers to perform operations comprising: receiving at a network node, in a setup or configuration message a list of supported slices and for each supported slice an associated pre-emptable information element or a non-pre-emptable information element comprising slices; receiving at the network node, a first session setup or modification request message for a first user equipment setting up a first session flow belonging to a first slice; receiving at the network node, a second session setup or modification request message for a second user equipment setting up a second session flow belonging to a second slice; receiving at the network node, a third session setup or modification request message for a third user equipment setting up a third session flow belonging to a third slice, wherein the first slice and the second slice are comprised in the pre-emptable information element or the non-pre-emptable information element associated with the third slice; and pre-empting the first session flow or the second session flow when admitting the third session flow based on the pre-emptable information element or the non-pre-emptable information element.

According to a twelfth aspect of the present invention, an apparatus comprising: means for receiving in a setup or configuration message a list of supported slices and for each supported slice an associated pre-emptable information element or a non-pre-emptable information element comprising slices; means for receiving a first session setup or modification request message for a first user equipment setting up a first session flow belonging to a first slice; means for receiving a second session setup or modification request message for a second user equipment setting up a second session flow belonging to a second slice; means for receiving a third session setup or modification request message for a third user equipment setting up a third session flow belonging to a third slice, wherein the first slice and the second slice are comprised in the pre-emptable information element or the non-pre-emptable information element associated with the third slice; and means for pre-empting the first session flow or the second session flow when admitting the third session flow based on the pre-emptable information element or the non-pre-emptable information element.

BRIEF DESCRIPTION OF THE DRAWINGS

For proper understanding of example embodiments, reference should be made to the accompanying drawings, wherein:

FIG. 5 illustrates a flow diagram of a method, according to certain example embodiments.

DETAILED DESCRIPTION

Figure 1:
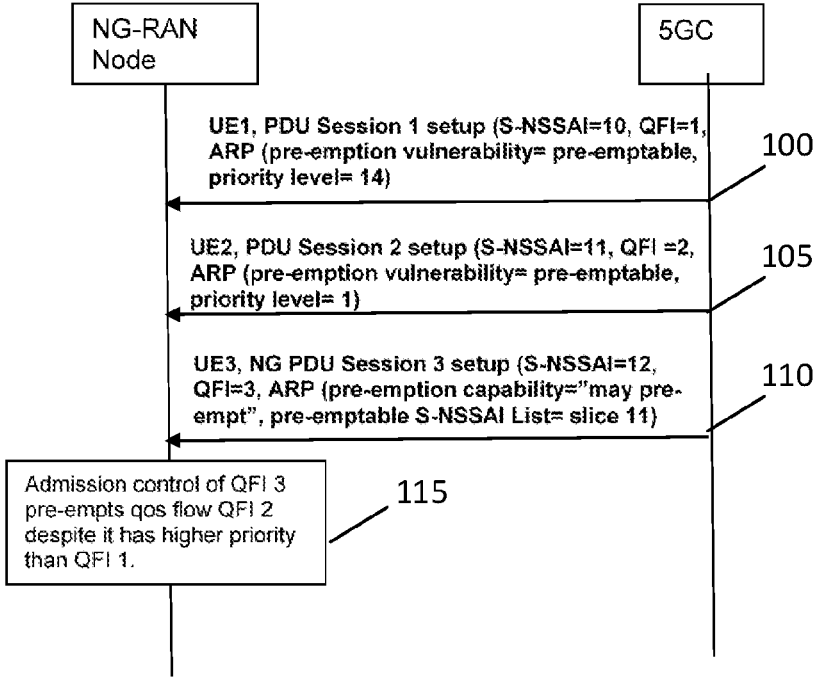
FIG. 1 illustrates an example of signalling flow between a next generation-radio access network (NG-RAN) node and a 5G core network (5GC), according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for slice aware pre-emption signaling.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

5G has largely inherited a prioritization process of admission control from 4G by using allocation retention priority (ARP) information elements. As described in 3$^{rd}$ Generation Partnership Project (3GPP), the ARP may include three fields. A first field may correspond to pre-emption capability where a quality of service (QoS) flow may be set to "may pre-empt" or "shall not pre-empt." A second field may correspond to pre-emption vulnerability where a QoS flow may be set to "pre-emptable" or "not pre-emptable." Further, a third field may correspond to a priority level ranging from 1 to 15. In certain cases, when a QoS flow that is set to "may pre-empt" needs to pre-empt another QoS flow to succeed admission control (e.g., due to congestion situation in the next generation (NG)-radio access network (RAN) node), the "victim" QoS flow to be pre-empted may be selected in a pool of all QoS flows set to "pre-emptable" with an algorithm using the priority level field in decreasing order.

The current ARP process may not be suitable for 5G, especially since it lacks flexibility when slicing is deployed in the network, and slice prioritization is desired. Moreover, the pre-emption process may not take slice into account. Thus, to discriminate among all the QoS flows of the numerous slices (hundreds or thousands of slices may be used in the operator network) setup at a given point in time, the 15 values of the priority level field may not be sufficient. However, extending the number of priority levels may not be enough either. For example, an operator may desire that certain calls are allowed to pre-empt other calls of slice 1, but not other calls of slice 2.

In view of the issues with the current ARP process, certain example embodiments may extend the current per user equipment (UE) ARP mechanisms to make it slice aware while making the extension backwards compatible to some extent. In doing so, certain example embodiments may maintain pre-emption capability and pre-emption vulnerability fields signaled in the ARP. However, according to certain example embodiments, a new slice-based pre-emption information element (IE) may be added to the ARP. The new IE may apply when the current pre-emption capability field of the ARP is set to "may pre-empt" for a QoS flow under admission control.

In certain example embodiments, the new slice-based pre-emption IE may be additionally included, and based on operator and/or subscription configuration, it may be set to a new pre-emptable single-network slice assistance information (S-NSSAI) list IE. For example, the new pre-emptable S-NSSAI list IE may include a list of slices that newly restricts the pre-emption pool where the particular call under admission control is allowed to pre-empt other QoS flows that are "pre-emptable," and have a pertaining slice included in the new pre-emptable S-NSSAI list. Alternatively, a new slice-based pre-emption IE may be set to a new non-pre-emptable S-NSSAI list IE. For example, this may include a list of slices that newly restrict the pre-emption pool where the particular call under admission control is allowed to pre-empt other QoS flows that are "pre-emptable," and do not have a pertaining slice included in the new non-pre-emptable S-NSSAI list.

According to certain example embodiments, the slice aware pre-emption may not be performed on the per UE ARP, but on a per slice pre-emption process. For instance, the per slice pre-emption process may include adding a list of slices in the interface management messages. In addition, for each slice of the list, the new pre-emptable S-NSSAI list IE and/or new non-pre-emptable S-NSSAI list IE may be associated constituting an overall per-slice pre-emption table.

FIG. 1 illustrates an example of a signalling flow between a next generation-radio access network (NG-RAN) node and a 5G core network (5GC), according to certain example embodiments. As illustrated in FIG. 1, at 100, a protocol data unit (PDU) session 1 setup (for a UE1) request/modify message may be received from 5GC by the NG-RAN node setting up a QoS flow with a QoS flow indicator (QFI) equal to 1. This PDU session 1 (and all its QoS flows) may belong to S-NSSAI (slice) 10. In addition, this QoS flow 1 may have a pre-emption vulnerability set to "pre-emptable," and a low priority level set to 14.

At 105, the 5GC may send a second PDU session 2 setup request/modify message (for a UE2), which may be received by the NG-RAN node setting up a second QoS flow with QFI equal to 2. This PDU session 2 (and all its QoS flows) may belong to S-NSSAI (slice) 11. In addition, this QoS flow 2 may have a pre-emption vulnerability set to "pre-emptable," and a high priority level set to 1.

At 110, the 5GC may send a third PDU session 3 setup request/modify message (for a UE3), which may be received by the NG-RAN node setting up a QoS flow with QFI equal to 3. This PDU session 3 (and all its QoS flows) belong to S-NSSAI (slice) 12. This QoS flow 3 may have a pre-emption capability set to "may pre-empt," and the ARP may include the new pre-emptable S-NSSAI list IE containing slice 11.

At 115, assuming there is a congestion situation in the NG-RAN node at the time the QoS flow 3 is setup, it may pre-empt one of the existing (already setup) QoS flows QFI 1 or QFI 2, which have the vulnerability set to "pre-emptable." Normally, QFI 1 would be pre-empted rather than QFI 2 because it has a lower priority. However, as illustrated in FIG. 1, receiving the new pre-emptable S-NS-SAI list IE containing slice 11 restricts the pool of pre-emptable QoS flows to QoS flows belonging to slice 11. Thus, in this example, QFI 1 is newly excluded from the pre-emption process. As a result, the NG-RAN node decides to pre-empt QFI 2 despite it having a higher priority compared to QFI 1.

Figure 2:
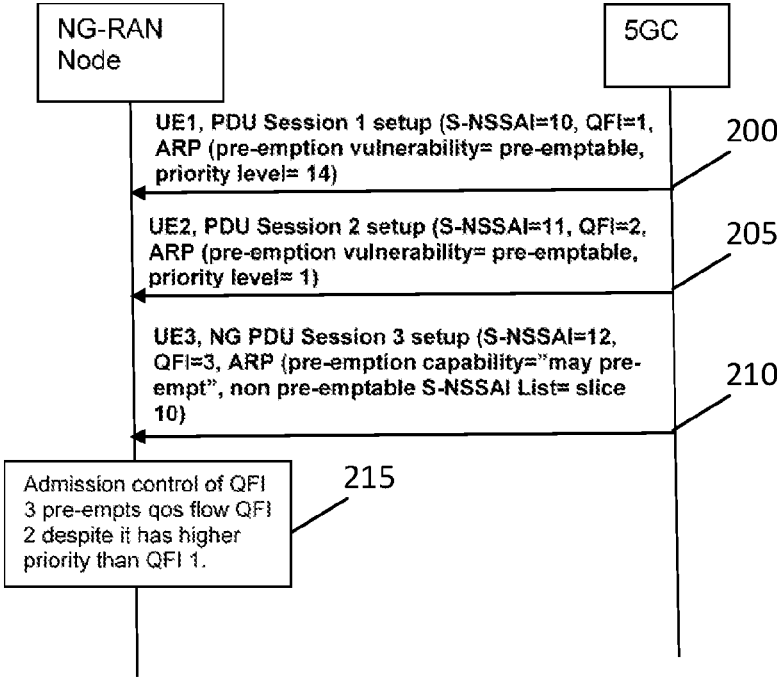
FIG. 2 illustrates an example of another signalling flow between an NG-RAN node and 5GC, according to certain example embodiments.

FIG. 2 illustrates an example of another signalling flow between the NG-RAN node and the 5GC, according to certain example embodiments. As illustrated in FIG. 2, at 200, the 5GC may send a PDU session 1 setup request/Modify message (for a UE1), which may be received by the NG-RAN node setting up a QoS flow with QFI equal to 1.

This PDU session 1 (and all its QoS flows) may belong to S-NSSAI (slice) 10. In addition, this QoS flow 1 may have a pre-emption vulnerability set to "pre-emptable," and a low priority level set to 14.

At 205, the 5GC may send a PDU session 2 setup request/Modify message (for a UE2), which may be received by the NG-RAN node setting up a QoS flow with QFI equal to 2. This PDU session 2 (and all its QoS flows) may belong to S-NSSAI (slice) 11. In addition, this QoS flow 2 may have a pre-emption vulnerability set to "pre-emptable," and a high priority level set to 1.

At 210, the 5GC may send a PDU session setup request/modify 3 (for a UE3), which may be received by the NG-RAN node setting up a QoS flow with QFI equal to 3. This PDU session 3 (and all its QoS flows) may belong to S-NSSAI (slice) 12. In addition, this QoS flow 3 may have a pre-emption capability set to "may pre-empt," and the ARP may include the new non-pre-emptable S-NSSAI list IE containing slice 11.

At 215, assuming there is a congestion situation in the NG-RAN node at the time the QoS flow 3 is setup, it may pre-empt one of the existing (already setup) QoS flows QFI 1 or QFI 2, which have the vulnerability set to "pre-emptable." Normally, QFI 1 would be pre-empted rather than QFI 2 because it has a lower priority. However, receiving the new non-pre-emptable S-NSSAI list IE containing slice 10 excludes from the pool of pre-emptable QoS flows those QoS flows belonging to slice 10. Thus, QFI 1 is newly excluded from the pre-emption process. As a result, the NG-RAN node decides to pre-empt QFI 2 despite it having a higher priority compared to QFI 1.

According to certain example embodiments, the new ARP parameters may be retrieved from the UE's subscription data in a unified data management (UDM) and/or provided from a policy control function (PCF), or locally by a session management function (SMF) (e.g., based on pre-configurations). According to other example embodiments the new ARP parameters are sent from the UE to 5GC and verified at 5GC before sending them to NG-RAN. According to other example embodiments, the new ARP parameters may be used in scenarios where admission control and the pre-emption process may apply. For instance, one scenario may include the UE's PDU session and bearer re-establishments when moving from radio resource control (RRC) idle (or RRC inactive) state to RRC active state. Another scenario may include handovers to target cells or the Xn context retrieve response message following a mobility in RRC_I-NACTIVE state, which cannot support all the user's calls to allow some PDU sessions and bearers to be established. In certain example embodiments, this may cover both NG-based handover scenarios and Xn-based handover scenarios or the Xn context retrieve response message following a mobility in RRC_INACTIVE state.

A further scenario that certain example embodiments may extend to may include dual connectivity addition requests/modifications of calls over Xn/X2 for use in non-stand-alone) architecture variants. Moreover, another scenario may include admission control in use cases where the NG-RAN node is deployed in split architecture involving central unit (CU) control plane (CP), CU user plane (UP), and distributed unit (DU) with an E1 interface between CU CP and CU UP, and an F1 interface between CU CP/CU UP and DU. Additionally, a further scenario may include the UE's PDU session and bearer re-establishments when moving between radio access technologies (RATs) including, for example, from LTE (with no N26 interface support) or wireless local area network (WLAN) to 5G. In certain example embodiments, the above-described scenarios may be covered by providing new ARP parameters intended to be added/transferred not only over the NG interface, but also over the Xn, E1, and F1 interfaces in any XnAP/E1AP/F1AP message that currently contains ARP.

Figure 3:
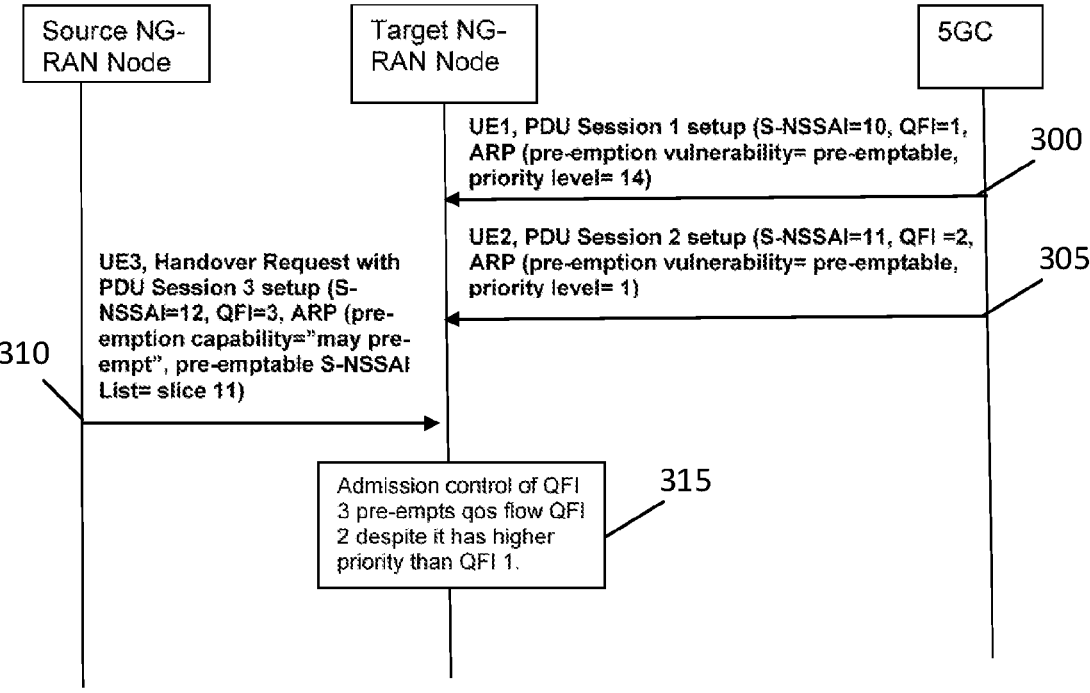
FIG. 3 illustrates an example signalling flow between a source NG-RAN node, a target NG-RAN node, and 5GC, according to certain example embodiments.

FIG. 3 illustrates an example signalling flow between a source NG-RAN node, a target NG-RAN node, and 5GC, according to certain example embodiments. As illustrated in FIG. 3, at 300, 5GC may send a PDU session 1 setup request/modify message (for a UE1), setting up a QoS flow with QFI equal to 1 which may be received by the (future) target NG-RAN node. This PDU session 1 (and all its QoS flows) may belong to S-NSSAI (slice) 10. In addition, this QoS flow 1 may have a pre-emption vulnerability set to "pre-emptable," and a low priority level set to 14.

At 305, 5GC may send a PDU session 2 setup request/ modify message (for a UE2), setting up a QoS flow with QFI equal to 2 which may be received by the (future) target NG-RAN node. This PDU session 2 (and all its QoS flows) may belong to S-NSSAI (slice) 11. In addition, this QoS flow 2 may have a pre-emption vulnerability set to "pre-emptable," and a high priority level set to 1.

At 310, the source NG-RAN node may request to estab-lish a PDU session 3 (for a UE3), which may be received by the target NG-RAN node for a UE3. In certain example embodiments, the PDU session 3 may be received by the target NG-RAN node within an Xn handover request mes-sage, setting up a QoS flow with QFI equal to 3. This PDU session 3 (and all its QoS flows) may belong to S-NSSAI (slice) 12. In addition, this QoS flow 3 may have a pre-emption capability set to "may pre-empt," and the ARP may include the new pre-emptable S-NSSAI list IE containing slice 11.

At 315, assuming there is a congestion situation in the target NG-RAN node at the time the QoS flow 3 is setup, it may pre-empt one of the existing (already setup) QoS flows QFI 1 or QFI 2, which have the vulnerability set to "pre-emptable." Normally, QFI 1 would be pre-empted rather than QFI 2 because it has a lower priority. However, receiving the new pre-emptable S-NSSAI list IE containing slice 11 within the new extended ARP in the handover request message restricts the pool of pre-emptable QoS flows. For example, the pool of pre-emptable QoS flows are restricted only to those QoS flows belonging to slice 11. Thus, in this example, QFI 1 is newly excluded from the pre-emption process. As a result, the NG-RAN node decides to pre-empt QFI 2 despite it having a higher priority com-pared to QFI 1.

Figure 4:
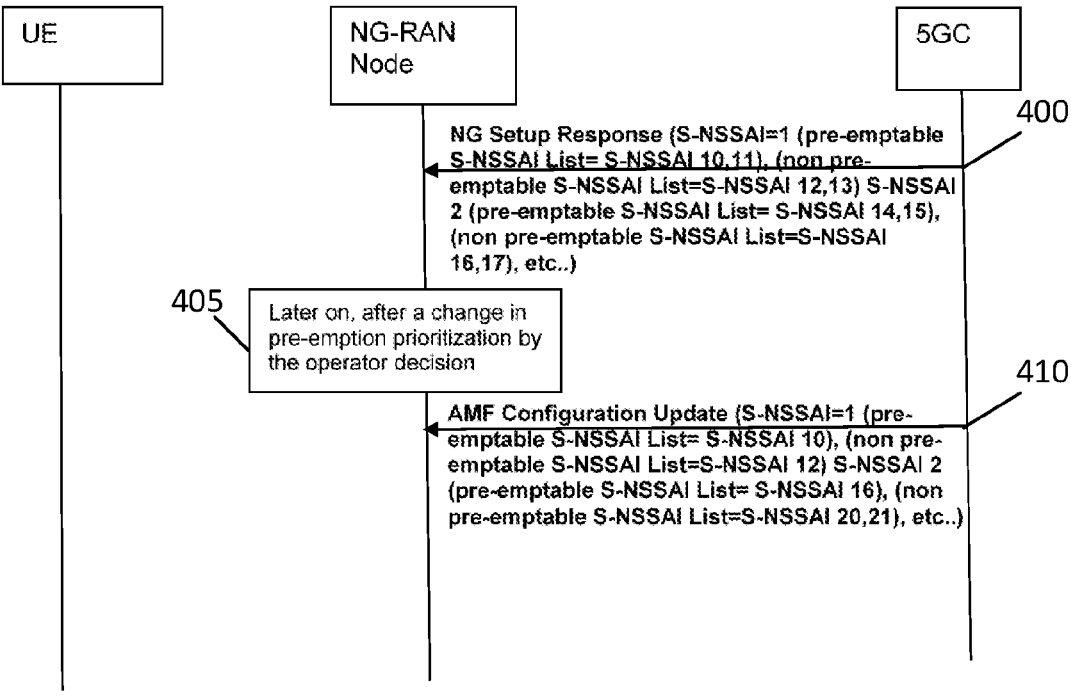
FIG. 4 illustrates an example signalling flow between an NG-RAN node, and 5GC, according to certain example embodiments.

FIG. 4 illustrates an example signalling flow between an NG-RAN node and 5GC, according to certain example embodiments. In particular, FIG. 4 illustrates an alternative where the slice aware pre-emption is not done on the per UE ARP, but on a per slice pre-emption process. According to certain example embodiments, the per slice pre-emption process may be defined as adding in interface management messages, a list of slices, and for each slice of the list, the new pre-emptable S-NSSAI list IE and/or a new non-pre-emptable S-NSSAI list IE. For example, for one S-NSSAI, a new pre-emptable S-NSSAI list IE and/or a new non-pre-emptable S-NSSAI list IE may be provided. This new pre-emptable S-NSSAI list IE may indicate which QoS flows the S-NSSAI 1 is allowed to pre-empt, and the new non-pre-emptable S-NSSAI list IE may indicate which QoS flows the S-NSSAI 1 is not allowed to pre-empt. In other example embodiments, for S-NSSAI 2, a new pre-emptable S-NSSAI list IE and/or a new non-pre-emptable S-NSSAI list IE may be provided. This new pre-emptable S-NSSAI list IE may indicate which QoS flows the S-NSSAI 2 is allowed to pre-empt, and the new non-pre-emptable S-NS-SAI list IE may indicate that QoS flows the S-NSSAI 2 is not allowed to pre-empt. According to certain example embodi-ments, the signaling of S-NSSAI 1 and S-NSSAI 2 may be sent over all interfaces (NG, Xn, E1, and F1). Alternatively, in other example embodiments, S-NSSAI 1 and S-NSSAI 2 may be configured directly in the nodes.

As illustrated in FIG. 4, at 400, the 5GC may send an NG setup response message to the NG-RAN node. According to certain example embodiments, the response may include an S-NSSAI (slice) of 1, and a pre-emption vulnerability set to "pre-emptable" for S-NSSAI list of slices 10 and 11, and a pre-emption vulnerability set to "non pre-emptable" for S-NSSAI list of slices 12 and 13. The NG Setup response may also include an S-NSSAI (slice) of 2, and a pre-emption vulnerability set to "pre-emptable" for S-NSSAI list of slices 14 and 15, and a pre-emption vulnerability set to "non pre-emptable" for S-NSSAI list of slices of 16 and 17.

At 405, at the NG-RAN node a change in pre-emption prioritization may be made by the operator decision. Further, at 410, 5GC may send an access and mobility management function (AMF) configuration update message to the NG-RAN node. According to certain example embodiments, the AMF configuration update message may include an S-NS-SAI (slice) of 1, and a pre-emption vulnerability set to "pre-emptable" for S-NSSAI list of slice 10, and a pre-emption vulnerability set to "non pre-emptable" for S-NS-SAI list of slice 12. The AMF configuration update message may also include an S-NSSAI (slice) of 2, and a pre-emption vulnerability set to "pre-emptable" for S-NSSAI list of slice 16, and a pre-emption vulnerability set to "non pre-empt-able" for S-NSSAI list of slices of 20 and 21.

Figure 8A:
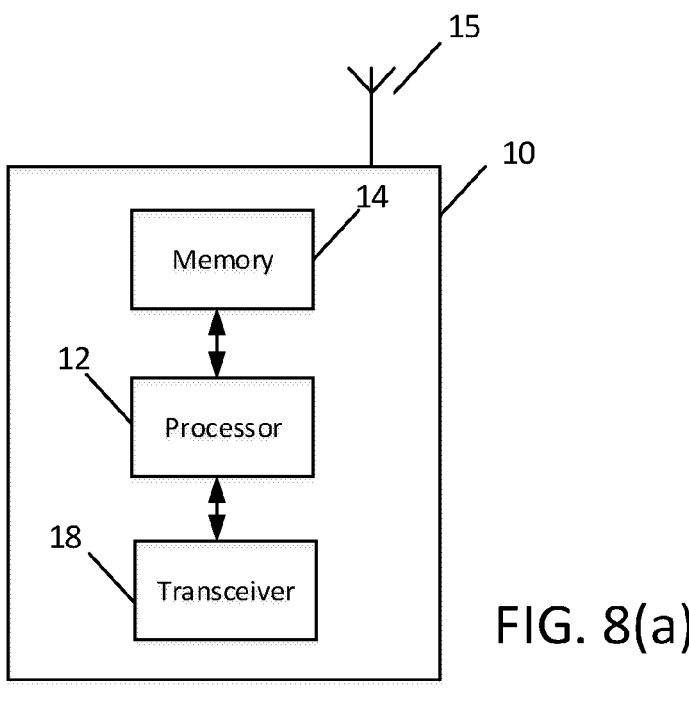
FIG. 8(a) illustrates an apparatus, according to certain example embodiments.
Figure 8B:
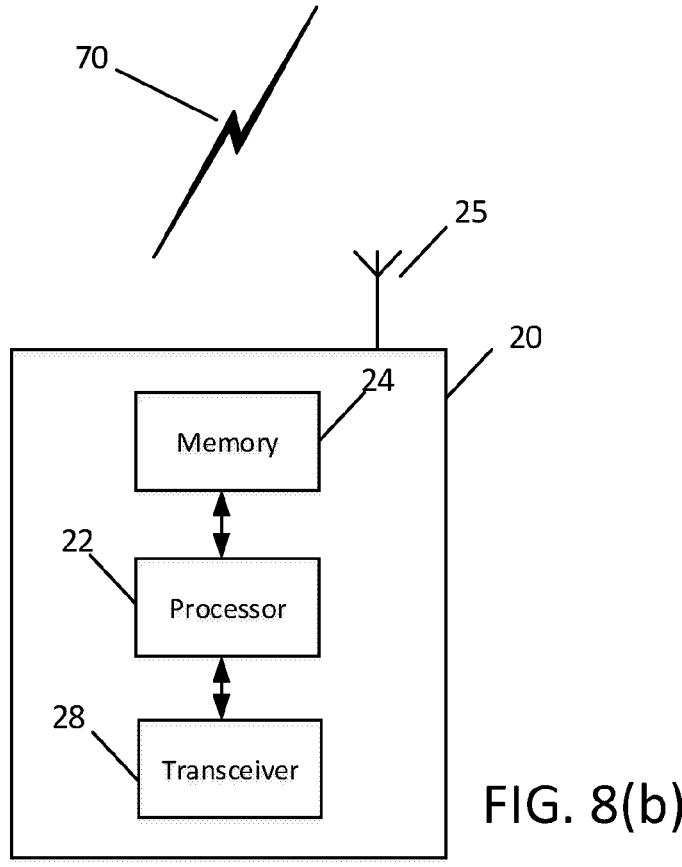
FIG. 8(b) illustrates another apparatus, according to certain example embodiments.

FIG. 5 illustrates a flow diagram of a method, according to certain example embodiments. In certain example embodiments, the flow diagram of FIG. 5 may be performed by a telecommunications network, network entity or net-work node in a 3GPP system, such as LTE or 5G-NR. For instance, in an example embodiment, the method of FIG. 5 may be performed by an NG-RAN node or a target NG-RAN node, for instance similar to apparatuses 10 or 20 illustrated in FIGS. 8(a) and 8(b).

According to certain example embodiments, the method of FIG. 5 may include, at 500, receiving at a network node, a first session setup or modification request message for a first user equipment setting up a first session flow. The method may also include, at 505, receiving at the network node, a second session setup or modification request mes-sage for a second user equipment setting up a second session flow. The method may further include, at 510, receiving at the network node, a third session setup or modification request message for a third user equipment setting up a third session flow. According to certain example embodiments, the third session flow may include a third parameter. Accord-ing to other example embodiments, the third parameter may also include a pre-emptable information element or a non-pre-emptable information element that includes a first slice to which the first session flow belongs or a second slice to which the second session flow belongs. In addition, the method may include, at 515, pre-empting the first session flow or the second session flow based on the pre-emptable information element or the non-pre-emptable information element.

Figure 6:
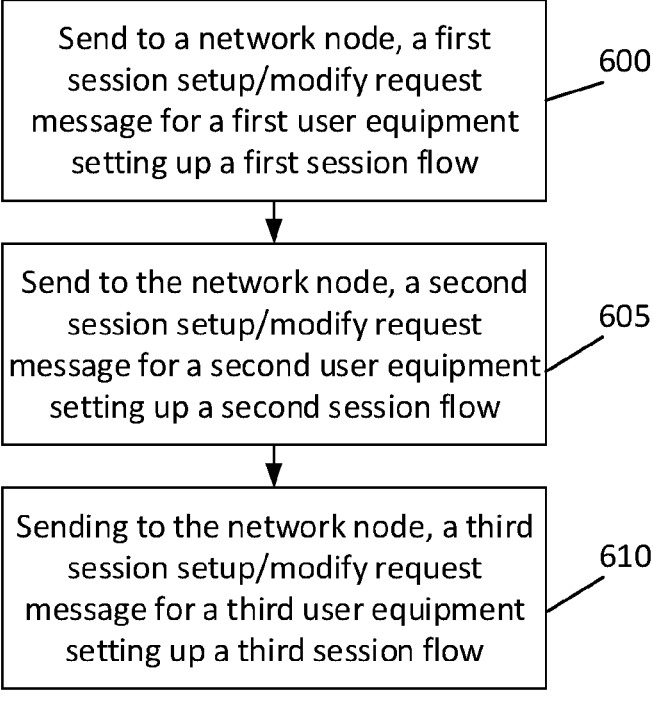
FIG. 6 illustrates a flow diagram of another method, according to certain example embodiments.

FIG. 6 illustrates a flow diagram of another method, according to certain example embodiments. In certain example embodiments, the flow diagram of FIG. 6 may be performed by a telecommunications network, network entity or network node in a 3GPP system, such as LTE or 5G-NR. For instance, in an example embodiment, the method of FIG. 6 may be performed by a 5GC network element, for instance similar to apparatuses 10 or 20 illustrated in FIGS. 8(*a*) and 8(*b*).

According to certain example embodiments, the method of FIG. 6 may include, at 600, sending to a network node, a first session setup or modification request message for a first user equipment setting up a first session flow. The method may also include, at 605, sending to the network node, a second session setup or modification request message for a second user equipment setting up a second session flow. The method may further include, at 610, sending to the network node, a third session setup or modification request message for a third user equipment setting up a third session flow. According to certain example embodiments the third session flow may include a third parameter. According to other example embodiments, the third parameter may include a pre-emptable information element or a non-pre-emptable information element that includes a first slice to which the first session flow belongs or a second slice to which the second session flow belongs. In certain example embodiments, the pre-emptable information element or the non-pre-emptable information element may determine which of the first session flow or the second session flow is pre-empted.

Figure 7:
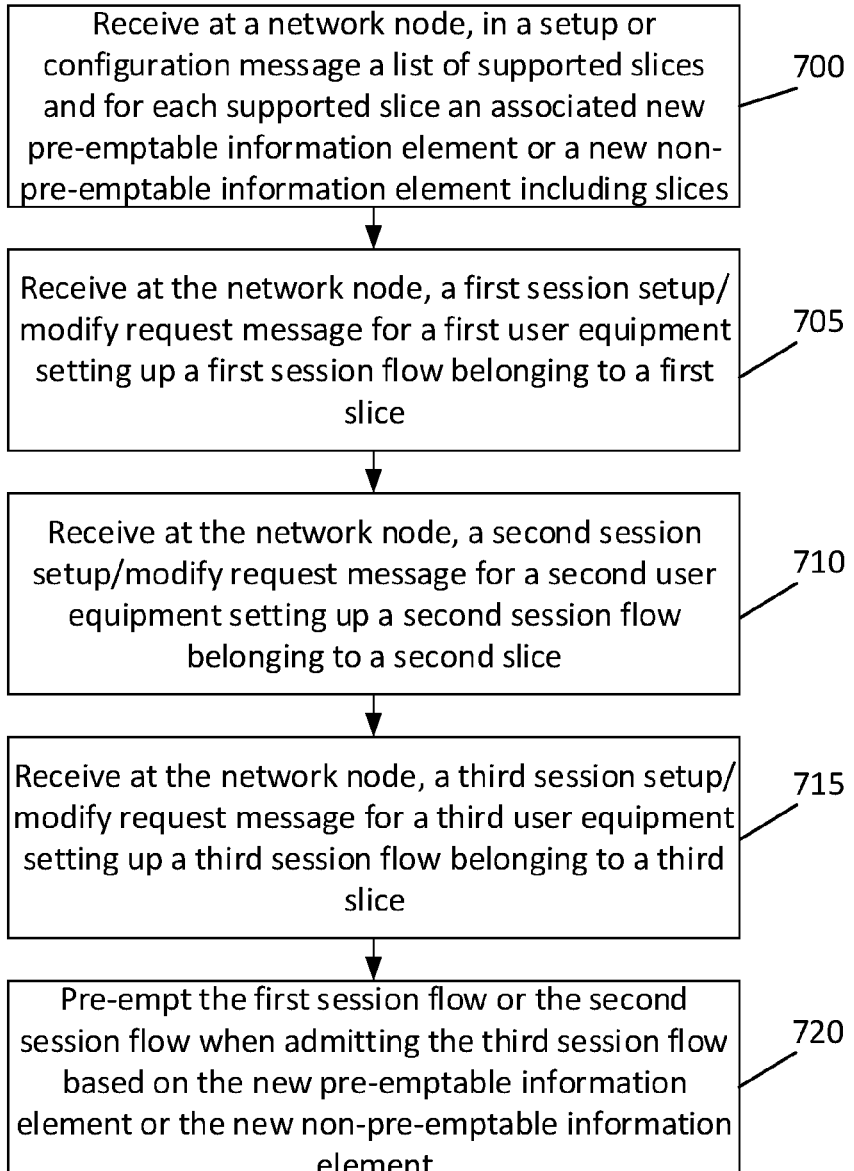
FIG. 7 illustrates a flow diagram of a further method, according to certain example embodiments.

FIG. 7 illustrates a flow diagram of a further method, according to certain example embodiments. In certain example embodiments, the flow diagram of FIG. 7 may be performed by a telecommunications network, network entity or network node in a 3GPP system, such as LTE or 5G-NR. For instance, in an example embodiment, the method of FIG. 7 may be performed by an NG-RAN node, for instance similar to apparatuses 10 or 20 illustrated in FIGS. 8(*a*) and 8(*b*).

According to certain example embodiments, the method of FIG. 7 may include, at 700, receiving at a network node, in a setup or configuration message a list of supported slices and for each supported slice an associated pre-emptable information element or a non-pre-emptable information element comprising slices. The method may also include, at 705, receiving at the network node, a first session setup or modification request message for a first user equipment setting up a first session flow belonging to a first slice. The method may further include, at 710, receiving at the network node, a second session setup or modification request message for a second user equipment setting up a second session flow belonging to a second slice. Further, at 715, the method may include receiving at the network node, a third session setup or modification request message for a third user equipment setting up a third session flow belonging to a third slice. According to certain example embodiments, the first slice and the second slice may be included in the pre-emptable information element or the non-pre-emptable information element associated with the third slice. At 720, the method may include pre-empting the first session flow or the second session flow when admitting the third session flow based on the pre-emptable information element or the non-pre-emptable information element. In certain example embodiments, the list of supported slices and for each supported slice the associated pre-emptable information element or the non-pre-emptable information element may be received by configuration in all nodes.

According to certain example embodiments, the first session flow may include a first allocation retention priority parameter with a first pre-emption vulnerability and a first priority. According to other example embodiments, the second session flow may include a second allocation retention priority parameter with a second pre-emption vulnerability and a second priority. According to further example embodiments, the third parameter comprises a third allocation retention priority parameter with a pre-emption capability. In certain example embodiments, the first session may belong to the first slice identified by a first single-network slice assistance information, the second session may belong to the second slice identified by a second single-network slice assistance information, and the third session may belong to a third slice identified by a third single-network slice assistance information.

In some example embodiments, the pre-emption vulnerability may be set to indicate a pre-emptable session flow, and the pre-emption capability may be set to indicate a session flow which may pre-empt other session flows. In other example embodiments, the pre-emptable information element may include the second slice to which the second session flow belongs, and the pre-emptable information element may restrict for the third session flow a pool of pre-emptable session flows to those session flows belonging to the second slice.

According to certain example embodiments, the non-pre-emptable information element may include the first slice to which the first session flow belongs, and the non-pre-emptable information element may exclude for the third session flow from a pool of pre-emptable session flows those session flows belonging to the first slice. According to other example embodiments, the third session setup may be received from a source network node within an Xn or NG handover request message or an Xn context retrieve response message. In certain example embodiments, the pre-emptable information element may be received in the Xn or NG handover request message or an Xn context retrieve response message, and may include the second slice to which the second session flow belongs. In some example embodiments, the handover request message or the Xn context retrieve response message may restrict for the third session flow a pool of pre-emptable session flows to those session flows belonging to the second slice. In other example embodiments, the first allocation retention priority parameter, the second allocation retention priority parameter, and the third allocation retention priority parameter may be added or transferred over an NG interface, an Xn interface, an E1 interface, or an F1 interface. According to other example embodiments, the third parameter or a part of the third parameter may be received by the 5GC from the first user equipment, the second user equipment, or the third user equipment. Further, in certain example embodiments, the 5GC may verify the third parameter or the part of the third parameter before sending the third parameter to the network node.

According to certain example embodiments, the NG-RAN node may also receive any of the first, or second or third flow setup or modification requests directly from the first user equipment, the second user equipment, or the third user equipment respectively, in an RRC (Radio Resource Control) message corresponding to a transition of the first user equipment, the second user equipment, or the third user equipment to a radio resource control connected mode. According to further example embodiments, the NG-RAN node may use the third parameter stored in the network node for a user equipment context corresponding to the user equipment identified in the received Radio Resource Control request to pre-empt the first session flow or the second session flow based on the pre-emptable information element or the non-pre-emptable information element contained in the third parameter.

FIG. 8(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network, such as an NG-RAN node or a target NG-RAN node. It should be noted that one of ordinary skill in the art would understand that apparatus 10 may include components or features not shown in FIG. 8(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(*a*).

As illustrated in the example of FIG. 8(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5 and 7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5 and 7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be an NG-RAN node or a target NG-RAN node, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive a first session setup or modification request message for a first user equipment setting up a first session flow. Apparatus 10 may also be controlled by memory 14 and processor 12 to receive a second session setup or modification request message for a second user equipment setting up a second session flow. Apparatus 10 may further be controlled by memory 14 and processor 12 to receive a third session setup or modification request message for a third user equipment setting up a third session flow. According to certain example embodiments, the third session flow may include a third parameter. According to other example embodiments, the third parameter may include a pre-emptable information element or a non-pre-emptable information element that includes a first slice to which the first session flow belongs or a second slice to which the second session flow belongs. In addition, apparatus 10 may be controlled by memory 14 and processor 12 to pre-empt the first session flow or the second session flow based on the pre-emptable information element or the non-pre-emptable information element.

According to other example embodiments, apparatus 10 may be controlled by memory 14 and processor 12 to receive in a setup or configuration message a list of supported slices and for each supported slice an associated pre-emptable information element or a non-pre-emptable information element comprising slices. Apparatus 10 may also be controlled by memory 14 and processor 12 to receive a first session setup or modification request message for a first user equipment setting up a first session flow belonging to a first slice. Apparatus 10 may further be controlled by memory 14 and processor 12 to receive a second session setup or modification request message for a second user equipment setting up a second session flow belonging to a second slice. Further, apparatus 10 may be controlled by memory 14 and processor 12 to receive a third session setup or modification request message for a third user equipment setting up a third session flow belonging to a third slice. According to certain example embodiments, the first slice and the second slice may be included in the pre-emptable information element or the non-pre-emptable information element associated with the third slice. In addition, apparatus 10 may be controlled by memory 14 and processor 12 to pre-empt the first session flow or the second session flow when admitting the third session flow based on the pre-emptable information element or the non-pre-emptable information element.

FIG. 8(*b*) illustrates an apparatus 20 according to certain example embodiments. In certain example embodiments, the apparatus 20 may be a node or element in a communications network or associated with such a network, such as a UE, mobile equipment (ME), mobile station, mobile device, stationary device, IoT device, or other device. In other example embodiments, apparatus 20 may be a base station, a Node B, an evolved Node B (eNB), 5G Node B or access point, next generation Node B (NG-NB or gNB), 5GC network element, and/or WLAN access point, associated with a radio access network (RAN), such as an LTE network, 5G or NR. It should be noted that one of ordinary skill in the art would understand that apparatus 20 may include components or features not shown in FIG. 8(*b*).

As illustrated in the example of FIG. 8(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-4 and 6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-4 and 6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

As discussed above, according to certain example embodiments, apparatus 20 may be elements of a 5GC network, for example. According to certain embodiments, apparatus 20 may be controlled by memory 14 and processor 12 to perform the functions associated with example embodiments described herein. For instance, in certain example embodiments, apparatus 20 may be controlled by memory 24 and processor 22 to send to a network node, a first session setup or modification request message for a first user equipment setting up a first session flow. Apparatus 20 may also be controlled by memory 24 and processor 22 to send to the network node, a second session setup or modification request message for a second user equipment setting up a second session flow. Apparatus 20 may further be controlled by memory 24 and processor 22 to send to the network node, a third session setup or modification request message for a third user equipment setting up a third session flow. According to certain example embodiments, the third session flow may include a third parameter. According to other example embodiments, the third parameter may include a pre-emptable information element or a non-pre-emptable information element that including a first slice to which the first session flow belongs or a second slice to which the second session flow belongs. According to further example embodiments, the pre-emptable information element or the non-pre-emptable information element determines which of the first session flow or the second session flow is pre-empted.

Further example embodiments may provide means for performing any of the functions, steps, or procedures described herein. For example, certain example embodiments may be directed to an apparatus that includes means for receiving a first session setup or modification request message for a first user equipment setting up a first session flow. The apparatus may also include means for receiving a second session setup or modification request message for a second user equipment setting up a second session flow. The apparatus may further include means for receiving a third session setup or modification request message for a third user equipment setting up a third session flow. According to certain example embodiments, the third session flow may include a third parameter. According to other example embodiments, the third parameter may include a pre-emptable information element or a non-pre-emptable information element that include a first slice to which the first session flow belongs or a second slice to which the second session flow belongs. Further, the apparatus may include means for pre-empting the first session flow or the second session flow based on the pre-emptable information element or the non-pre-emptable information element.

Other example embodiments may be directed to a further apparatus that includes means for receiving in a setup or configuration message a list of supported slices and for each supported slice an associated pre-emptable information element or a non-pre-emptable information element comprising slices. The apparatus may also include means for receiving a first session setup or modification request message for a first user equipment setting up a first session flow belonging to a first slice. The apparatus may further include means for receiving a second session setup or modification request message for a second user equipment setting up a second session flow belonging to a second slice. Further, the apparatus may include means for receiving a third session setup or modification request message for a third user equipment setting up a third session flow belonging to a third slice. In certain example embodiments, the first slice and the second slice may be included in the pre-emptable information element or the non-pre-emptable information element associated with the third slice. Further, the apparatus may include means for pre-empting the first session flow or the second session flow when admitting the third session flow based on the pre-emptable information element or the non-pre-emptable information element.

Other example embodiments may be directed to a further apparatus that includes means for sending to a network node, a first session setup or modification request message for a first user equipment setting up a first session flow. The apparatus may also include means for sending to the network node, a second session setup or modification request message for a second user equipment setting up a second session flow. The apparatus may further include means for sending to the network node, a third session setup or modification request message for a third user equipment setting up a third session flow. According to certain example embodiments, the third session flow may include a third parameter. According to other example embodiments, the third parameter may include a pre-emptable information element or a non-pre-emptable information element that comprises a first slice to which the first session flow belongs or a second slice to which the second session flow belongs. According to further example embodiments, the pre-emptable information element or the non-pre-emptable information element may determine which of the first session flow or the second session flow is pre-empted.

Certain example embodiments described herein provide several technical improvements, enhancements, and/or advantages. In some example embodiments, it may be possible to extend the current per UE ARP mechanism to make it slice aware while making the extension backwards compatible to some extent. In other example embodiments, it may be possible to add a new slice-based pre-emption IE to the ARP, and apply this new IE when the current pre-emption capability field of the ARP is set to "may pre-empt" for a QoS flow under admission control. This new slice-based pre-emption IE may include a new pre-emptable information element or a new non-pre-emptable information element that will determine restrictions on the pool of pre-emptable QoS flows at the time of admission control.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

ARP Allocation retention priority
eNB Enhanced Node B
gNB 5G or Next Generation NodeB
LTE Long Term Evolution
NR New Radio
PCF Policy Control Function
UE User Equipment

We claim:

1. An apparatus, comprising:
at least one processor; and
at least one memory comprising computer program code,
the at least one memory and computer program code are
   configured, with the at least one processor, to cause the
   apparatus at least to:
   receive, a first session setup or modification request
      message for a first user equipment setting up a first
      session flow;
   receive, a second session setup or modification request
      message for a second user equipment setting up a
      second session flow;
   receive, a third session setup or modification request
      message for a third user equipment setting up a third
      session flow, wherein the third session flow comprises a third parameter, and wherein the third
      parameter comprises a pre-emptable information element or a non-pre-emptable information element that
      comprises a first slice to which the first session flow
      belongs or a second slice to which the second session
      flow belongs; and
   pre-empting the first session flow or the second session
      flow based on the pre-emptable information element
      or the non-pre-emptable information element.

2. The apparatus according to claim 1,
wherein the first session belongs to the first slice identified
   by a first single-network slice assistance information,
wherein the second session belongs to the second slice
   identified by a second single-network slice assistance
   information, and
wherein the third session belongs to a third slice identified
   by a third single-network slice assistance information.

3. The apparatus according to claim 1,
wherein the first session flow comprises a first allocation
   retention priority parameter with a first pre-emption
   vulnerability and a first priority,
wherein the second session flow comprises a second
   allocation retention priority parameter with a second
   pre-emption vulnerability and a second priority, and
wherein the third parameter comprises a third allocation
   retention priority parameter with a pre-emption capability.

4. The apparatus according to claim 3,
wherein at least one of the first pre-emption vulnerability or the second pre-emption vulnerability is set to indicate a pre-emptable session flow, and
wherein the pre-emption capability is set to indicate a session flow which may pre-empt other session flows.

5. The apparatus according to claim 1, wherein the first allocation retention priority parameter, the second allocation retention priority parameter, and the third allocation retention priority parameter are added or transferred over an NG interface, Xn interface, an E1 interface, or an F1 interface.

6. The apparatus according to claim 1, wherein the third session setup is received from a source network node within a handover request message or a context retrieve response message, or from a core network element.

7. The apparatus according to claim 1, wherein the apparatus is further caused to:
receive any of the first, or second or third flow setup or modification requests directly from the first user equipment, the second user equipment, or the third user equipment respectively, in a radio resource control message corresponding to a transition of the first user equipment, the second user equipment, or the third user equipment to a radio resource control connected mode; and
use the third parameter stored in the network node for a user equipment context corresponding to the user equipment identified in the received request to pre-empt the first session flow or the second session flow based on the pre-emptable information element or the non-pre-emptable information element.

8. An apparatus, comprising:
at least one processor; and
at least one memory comprising computer program code, the at least one memory and computer program code are configured, with the at least one processor, to cause the apparatus at least to:
send to a network node, a first session setup or modification request message for a first user equipment setting up a first session flow;
send to the network node, a second session setup or modification request message for a second user equipment setting up a second session flow; and
send to the network node, a third session setup or modification request message for a third user equipment setting up a third session flow, wherein the third session flow comprises a third parameter, wherein the third parameter comprises a pre-emptable information element or a non-pre-emptable information element that comprises a first slice to which the first session flow belongs or a second slice to which the second session flow belongs, and wherein the pre-emptable information element or the non-pre-emptable information element determines which of the first session flow or the second session flow is pre-empted.

9. The apparatus according to claim 8,
wherein the first session belongs to the first slice identified by a first single-network slice assistance information,
wherein the second session belongs to the second slice identified by a second single-network slice assistance information, and
wherein the third session belongs to a third slice identified by a third single-network slice assistance information.

10. The apparatus according to claim 8,
wherein the first session flow comprises a first allocation retention priority parameter with a first pre-emption vulnerability and a first priority,
wherein the second session flow comprises a second allocation retention priority parameter with a second pre-emption vulnerability and a second priority, and
wherein the third parameter comprises a third allocation retention priority parameter with a pre-emption capability.

11. The apparatus according to claim 10,
wherein at least one of the first pre-emption vulnerability or the second pre-emption vulnerability is set to indicate a pre-emptable session flow, and
wherein the pre-emption capability is set to indicate a session flow which may pre-empt other session flows.

12. The apparatus according to claim 8, wherein the third session setup is sent within a handover request message or a context retrieve response message.

13. The apparatus according to claim 8, wherein the apparatus is further caused to:
receive the third parameter or a part of the third parameter from the first user equipment, the second user equipment, or the third user equipment; and
verify the received third parameter or the part of the third parameter before sending the third parameter to the network node.

14. A method, comprising:
receiving at a network node, a first session setup or modification request message for a first user equipment setting up a first session flow;
receiving at the network node, a second session setup or modification request message for a second user equipment setting up a second session flow;
receiving at the network node, a third session setup or modification request message for a third user equipment setting up a third session flow, wherein the third session flow comprises a third parameter, and wherein the third parameter comprises a pre-emptable information element or a non-pre-emptable information element that comprises a first slice to which the first session flow belongs or a second slice to which the second session flow belongs; and
pre-empting the first session flow or the second session flow based on the pre-emptable information element or the non-pre-emptable information element.

15. The method according to claim 14,
wherein the pre-emptable information element comprises the second slice to which the second session flow belongs, and
wherein the pre-emptable information element restricts for the third session flow a pool of pre-emptable session flows to those session flows belonging to the second slice.

16. The method according to claim 14,
wherein the non-pre-emptable information element comprises the first slice to which the first session flow belongs, and
wherein the non-pre-emptable information element excludes for the third session flow from a pool of pre-emptable session flows those session flows belonging to the first slice.

* * * * *